United States Patent [19]
Anlauf et al.

[11] Patent Number: 5,216,881
[45] Date of Patent: Jun. 8, 1993

[54] ARRANGEMENT FOR DETERMINING THE ENGINE SPEED AND AN ADDITIONAL OPERATING CHARACTERISTIC VARIABLE OF AN INTERNAL COMBUSTION ENGINE BY MEANS OF A SENSOR

[75] Inventors: Jürgen Anlauf, Göppingen; Walter Dinkelacker, Stuttgart; Gerhard Haaga, Dettingen/Teck; Alexander Schwarz, Plochingen; Raymond Sieg, Stuttgart; Ulrich Schlienz, Bühl-Neusatz, all of Fed. Rep. of Germany

[73] Assignee: Robert Bosch GmbH, Stuttgart

[21] Appl. No.: 632,081

[22] Filed: Dec. 21, 1990

[30] Foreign Application Priority Data

Dec. 21, 1989 [DE] Fed. Rep. of Germany ....... 3942298

[51] Int. Cl.$^5$ ....................... F01N 3/00; G01M 19/00
[52] U.S. Cl. ...................... 60/276; 73/118.1; 123/676; 123/687
[58] Field of Search .............. 60/276, 285, 277; 73/116, 117.2, 117.3, 118.1; 123/676, 687, 691

[56] References Cited

U.S. PATENT DOCUMENTS

| | | | |
|---|---|---|---|
| 3,284,165 | 11/1966 | Baumann | 60/276 |
| 3,908,167 | 9/1975 | Hulls et al. | |
| 4,040,294 | 8/1977 | Matsuda | 60/277 |
| 4,083,234 | 4/1978 | Aono | 60/277 |
| 4,129,105 | 12/1978 | Ito | 60/276 |
| 4,164,142 | 8/1979 | Blanke | 73/118.1 |
| 4,171,637 | 10/1979 | Blanke | 73/118.1 |
| 4,294,214 | 10/1981 | Treible | 123/676 |
| 4,452,079 | 6/1984 | Tiller | |
| 5,025,767 | 6/1991 | Kume | 123/691 |

FOREIGN PATENT DOCUMENTS

WO89/01623 2/1989 Fed. Rep. of Germany .
52-123292 10/1977 Japan .

Primary Examiner—Douglas Hart
Attorney, Agent, or Firm—Walter Ottesen

[57] ABSTRACT

The invention relates to an arrangement which permits operating characteristic variables such as the crankshaft rotational speed and the content of exhaust gas components to be determined in the workshop. The sensor is mounted so as to be stationary in the exhaust gas system or is only intermittently mounted in this system. According to one arrangement of the invention, the exhaust gas sensor includes a first device which receives the pressure of the exhaust gas of the engine. In this way, the crankshaft rotational speed can be arrived at. A second device is arranged in the exhaust gas sensor which has an output signal which is a measure for the content of an exhaust gas component. A further embodiment of the arrangement of the invention includes an exhaust gas sensor having a first device which is configured as a fault meter, temperature sensor or as a hot wire flow meter. Other devices can be utilized to detect further variables of the exhaust gas and evaluate the same.

9 Claims, 3 Drawing Sheets

ARRANGEMENT FOR DETERMINING THE ENGINE SPEED AND AN ADDITIONAL OPERATING CHARACTERISTIC VARIABLE OF AN INTERNAL COMBUSTION ENGINE BY MEANS OF A SENSOR

FIELD OF THE INVENTION

The invention relates to an arrangement for measuring a first and an additional operating characteristic variable of an internal combustion engine by means of a sensor mounted in the exhaust gas system.

BACKGROUND OF THE INVENTION

It is generally known that for the operation of an internal combustion engine, it is usual that mixture preparation equipment forms an air/fuel mixture outside of the combustion chamber of the engine. The mixture is drawn in by suction by a downward moving piston and flows into the combustion chamber. The mixture, which has flowed in, is compressed by the upwardly moving piston and is ignited. The combustion heat released in this manner increases the pressure of the precompressed gas. This combustion pressure is increased with respect to the precompressing pressure and supplies mechanical work via the piston and the crankshaft.

After each combustion stroke, the piston discharges the burnt gases as exhaust gases and then draws a fresh air/fuel mixture into the combustion chamber via suction. This gas exchange takes place in accordance with the four-stroke principle. In this way, a work operation takes place in two crankshaft rotations.

At this point, it is noted that the arrangement according to the invention is however not limited to a four-stroke spark-ignition engine. Indeed, it is also suitable for diesel and Wankel engines as well as for other internal combustion engines.

The physical characteristics and the chemical composition of the exhaust gases of the engine permit conclusions to be drawn with respect to several of the operating characteristic variables of the engine such as engine speed, fuel composition, air/fuel ratio, exhaust gas temperature and the like.

U.S. Pat. No. 3,908,167 discloses an arrangement for measuring an operating characteristic variable, namely the engine speed, of an internal combustion engine by evaluating a variable of the exhaust gas. In this arrangement, the evaluation of a light signal which changes because of the exhaust gases is used to operate on the engine speed.

A sensor suitable for this purpose includes means which can emit light, receive light and convert the light signal into electrical signals. The exhaust gas is conducted between the light source and the light receiver. This type of sensor is however quite complex.

It is also generally known to control the air/fuel mixture for an internal combustion engine by means of an exhaust gas probe which supplies a signal corresponding to the content of one gas component (oxygen) of the exhaust gas and this permits conclusions to be drawn as to the air/fuel mixture supplied to the engine.

U.S. Pat. No. 5,140,535, discloses a system which linearizes the signal of an oxygen probe with a voltage jump in the measuring range concerned and thereby makes possible an indication of the oxygen content in the exhaust gas and of the lambda values which are a direct measure for the air/fuel mixture supplied to the engine.

U.S. Pat. No. 4,452,079 and published German patent application DE-OS 38 04 680 disclose that it is also known to determine the speed of an engine by evaluating acoustic signals which emanate from the engine.

In contrast to the above, the requirement is present to detect and evaluate several variables caused by the exhaust gases which can be utilized to draw conclusions with respect to operating characteristic variables of the engine.

Published Japanese patent application 52-123 292 discloses an oxygen sensor which includes a solid electrolyte and a thermo element as a single unit.

However, no system is known wherein several operating characteristic variables of an engine can be determined by means of a single exhaust gas sensor.

SUMMARY OF THE INVENTION

It is an object of the invention to provide an arrangement for measuring several operating characteristic variables which detects at least two variables caused by the exhaust gases by means of one exhaust gas sensor. It is a further object of the invention to provide such an arrangement wherein the exhaust gas sensor is introduced into the exhaust gas system of the engine for testing, adjusting and controlling purposes and which is simple to realize.

According to one embodiment of the invention, the possibility is afforded that the exhaust gas sensor is accommodated in the exhaust gas system so as to be stationary. The output signals of the exhaust gas sensor with reference to the two variables caused by the exhaust gas can, individually or in common, be used for controlling the operating characteristic variables continuously or intermittently. For diagnostic purposes, a suitable electrical connection is then provided to a diagnostic apparatus.

The arrangement according to the invention permits the operating characteristic variables of an engine to be detected in common for diagnostic purposes and which can be checked in the context of a shop and adjusted as may be required.

BRIEF DESCRIPTION OF THE DRAWINGS

The invention will now be described with reference to the drawings wherein.

DESCRIPTION OF THE PREFERRED EMBODIMENTS OF THE INVENTION

With respect to the drawings, it should be noted that the means illustrated in the embodiment and the processing steps are only exemplary. Accordingly, it is advantageous when these means and processing steps are at least partially integrated as part of a measuring and adjustment arrangement. It is further conceivable that the processing steps are part of a microcomputer or its program.

In the following, an arrangement with only one sensor is described for the purpose of clarity and, with the aid of the output signal of this sensor, conclusions are drawn to only two operating characteristic variables. The first characteristic variable is the speed of the engine and the second operating characteristic variable relates to the content of a gas component in the exhaust gas such as oxygen, carbon oxide or other gas components known to persons skilled in the art.

At this point, attention is also called to the fact that the limitation of this description to the two mentioned operating characteristic variables does not constitute a limitation of the invention but instead serves the purpose of providing clarity with respect to the description which follows.

Further operating characteristic variables to which conclusions can be drawn are, for example, the exhaust gas temperature, the fuel composition and the like. The evaluation of these operating characteristic variables can, for example, take place by means of the determination of the internal resistance of a solid electrolyte which also serves for measuring the content of an exhaust gas component or via suitable means which are contained in the exhaust gas sensor.

Figure 1:
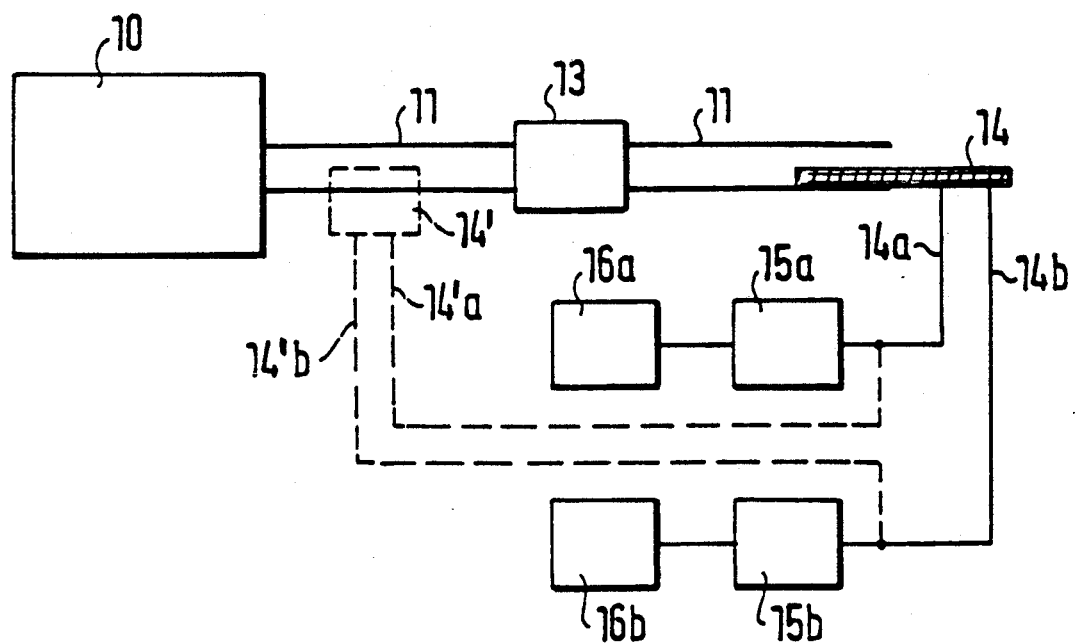
FIG. 1 is a block diagram of the arrangement according to the invention for measuring an operating characteristic variable of an internal combustion engine by means of a sensor disposed in the exhaust gas system thereof.

FIG. 1 is a block diagram showing the arrangement of the invention in combination with an internal combustion engine 10 which is to be tested. The block diagram only includes means which are essential for explaining the invention. It is understood that other means are required for the operation of the engine in order to operate the engine in order that it comply with environmental standards.

The exhaust gases discharged by the engine 10 reach the exhaust gas system 11 wherein a catalyzer 13 is mounted. The catalyzer converts the significant toxic gas components such as carbon monoxide, hydrocarbons and nitrogen oxide into less toxic gas components via chemical or thermal processes.

An exhaust gas sensor 14 is introduced at the end of the exhaust gas system 11 and the sensor detects variables of the exhaust gas discharged by the engine and supplies signals having values corresponding to these variables. The first signal is supplied to indicating unit 16a via output 14a and amplifier 15a and a second signal is supplied to indicating unit 16b via output 14b and amplifier 15b.

Figure 1A:
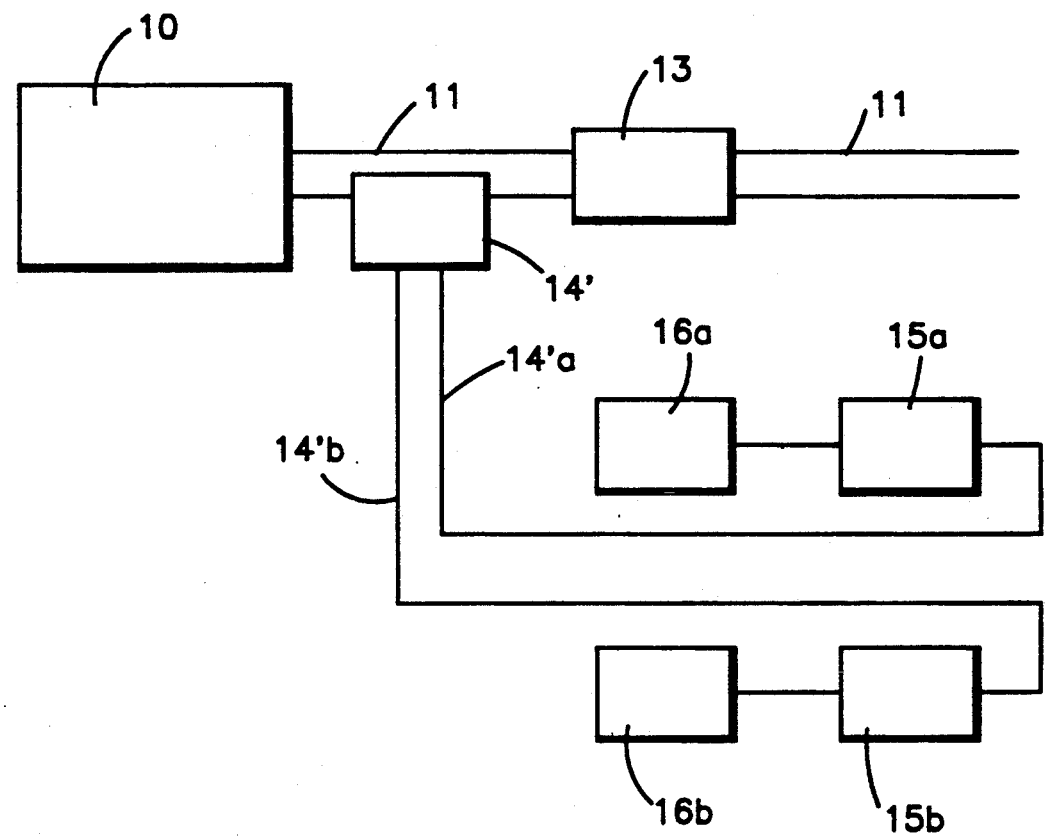
FIG. 1a is a block diagram of an arrangement according to an alternate embodiment wherein the exhaust gas sensor is mounted stationary in the exhaust gas system.
Figure 2:
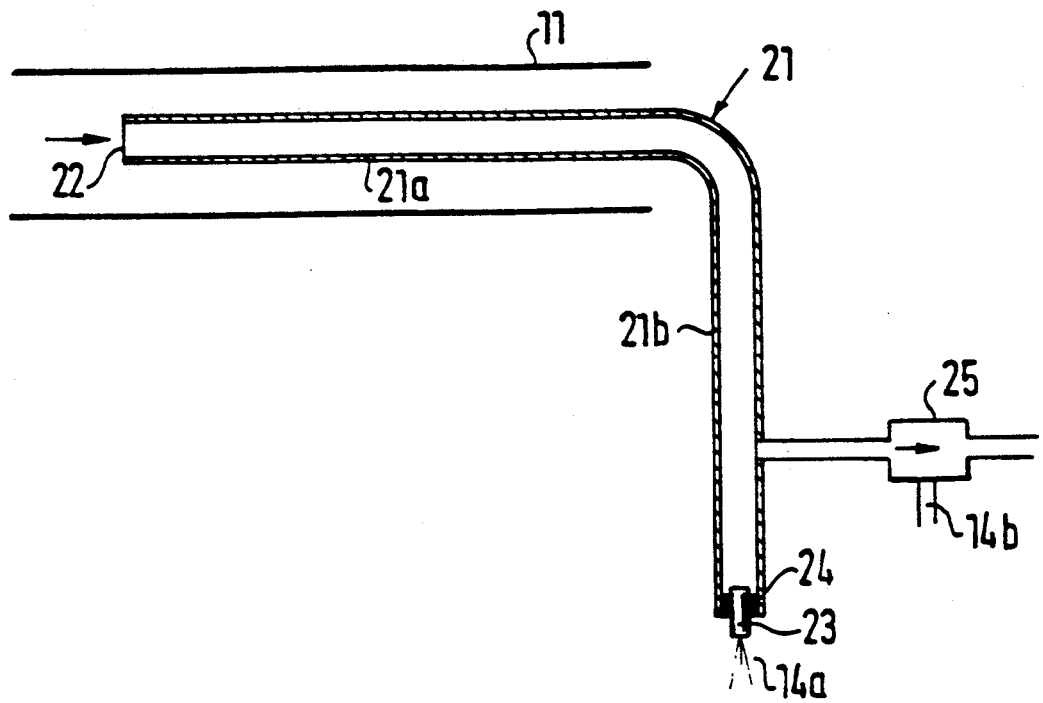
FIG. 2 is a preferred embodiment of a sensor used in the arrangement of FIG. 1; and, FIG. 3 is a waveform which shows the course of the pressure in the exhaust gas over a number of crankshaft rotations.

An exhaust gas sensor 14 suitable for the arrangement according to the invention is shown in FIG. 2. This exhaust gas sensor can be so configured that it can be mounted stationary in the exhaust gas system. This variation is depicted in FIG. 1 in broken lines and identified by reference numeral 14' and is shown in solid outline in FIG. 1a.

The output signals of the exhaust gas sensor can individually or conjointly be used for the control of operating characteristic variables of the engine and/or for diagnostic purposes.

In the material which follows, the preferred embodiment will be described wherein the exhaust gas sensor used is introduced from the end of the exhaust gas system.

According to FIG. 2, the suitable exhaust gas sensor comprises a tube 21 having a gas inlet 22 at one end thereof and a first means 23 and a second means 25 mounted at the other end of the tube 21 for detecting first and second variables, respectively, of the exhaust gases.

In a preferred first embodiment, the first means 23 can be a pressure sensor (or a microphone) having the output 14a and, by means of its output signal, a conclusion can be drawn as to the speed of the engine. This pressure sensor is mount 24.

The second means 25 defines a sensor for the exhaust gas composition and has an output 14b. With this sensor, the content of one gas component such as carbon monoxide or oxygen can be determined.

As described above, each cylinder of the engine discharges exhaust gases at a specific working stroke which, for a four-stroke spark-ignition engine can be once during two crankshaft rotations. This discharge of the exhaust gases leads to pressure fluctuations in the exhaust gas system which are detected by a pressure sensor.

Figure 3:
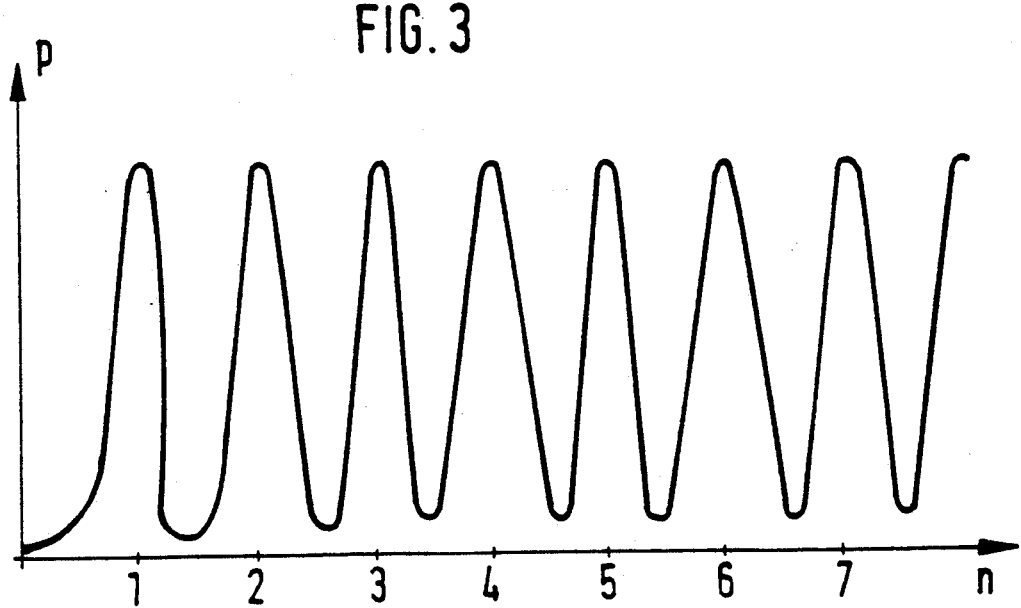

FIG. 3 is a waveform showing the course of the pressure (p) of the exhaust gas as a function of the number (n) of the crankshaft rotations of a four-cylinder internal combustion engine.

The four cylinders of the engine are arranged in cylinder groups (cylinders 1, 3 and cylinders 2, 4). These cylinder groups operate in counterphase to each other and each cylinder discharges its exhaust gases once during two crankshaft rotations. For this reason, these two groups discharge exhaust gases once per crankshaft revolution and, in this way, pressure fluctuations, which are displaced with respect to each other, occur once per crankshaft revolution.

These pressure fluctuations continue through the pipe 21 and reach the pressure sensor 23. The pressure sensor 23 converts the pressure fluctuations into electrical signals which are emitted at output 14a and are amplified by the amplifier 15a and thereafter are supplied to an indicating unit 16a. The indicating unit converts the electrical signals into an rpm value by means of a suitable process and indicates the same.

It is also possible to use the determined engine speed signal to control operating characteristic variables of the engine. This takes place preferably when the exhaust gas sensor 14' is accommodated so as to be stationary in the exhaust gas system 11.

The conversion of the pressure sensor output signal into an rpm value can take place, for example, pursuant to a method described in one or more of the publications referred to above or by other suitable processes known to persons of ordinary skill in the art.

If the sensor shown in FIG. 2 is introduced into the end of the exhaust gas system 11 with the pressure sensor 23 and the sensor for the exhaust gas composition 25, then the exhaust gases of the engine pass through the pipe 21 and to the sensor for the exhaust gas composition which provides a signal at the output 14b which is a measure for the concentration of an exhaust gas component.

This electrical signal is conducted to the amplifier 15b as shown in FIG. 1 where it is amplified and supplied to an indicating unit 16b. The indicating unit 16b converts the amplified signal into a concentration value of the gas concentration ($O_2$, $CO_2$ etc.) to be measured and indicates this value.

It is also possible to use the detected concentration value for controlling operating characteristic variables of the engine. This preferably takes place when the exhaust gas sensor 14' is fixedly mounted in the exhaust gas system 11.

The conversion of the amplified measuring signal into a concentration value is dependent upon the sensor used for the exhaust gas component.

When utilizing an oxygen probe, a distinction must be made as to those probes which supply an output signal over a wide range which is proportional to the oxygen content and those probes which show a jump in their output signal in the range to be measured.

The determination of the content of the desired exhaust gas component is known from the publications referred to above and is not discussed further at this point.

The first and second means suitable for receiving the desired measurement variables as well as the materials suitable for fastening these means are, in part, quite sensitive to temperature. For this reason, they must be protected against excessive warming by the exhaust gases.

This excessive heating can, for example, be avoided by cooling measures which provide suitable cooling media (gas, liquid) in the region to be cooled.

A further possibility is that the diameter of the pipe be configured to be as small as possible. In this way, only a small quantity of hot exhaust gases enters the tube which is necessarily required for the desired measurements.

In this case, it has been shown to be at least partially necessary to avoid overheating by exhaust gases which flow along the outer wall surface of the tube 21. The suitable geometric form of the exhaust gas sensor 14 can be arrived at in that the tube 21 of the exhaust gas sensor utilized is advantageously provided with a turn which subdivides the tube into the parts 21a and 21b.

As shown in FIG. 2, only the part 21a is introduced into the exhaust gas system 11 of the internal combustion engine. In this way, the condition is obtained that exhaust gases which flow past along the outer surface of the tube 21 do not reach the region of the pressure sensor 23 and the region of the sensor 25 for the composition of the exhaust gases. Instead, these exhaust gases flow further in the direction of the tube 21a and, in this way, the condition is avoided that the sensors are unnecessarily heated which are mounted in the part 21b of the tube 21.

If an overheating of sensitive parts occurs notwithstanding the above measures, then the possibility remains that the surface of the tube 21 and especially part 21b can be configured so that an optimal heat discharge occurs.

In addition, the heat discharge can be optimized by suitable materials for the exhaust gas sensor 14. What is decisive in this case is the temperature conductivity and temperature capacity.

According to another embodiment, individual regions of the exhaust gas sensor can be maintained in specific temperature ranges by means of a temperature control unit (not shown).

Several sensors for measuring the exhaust gas composition such as those made of a solid electrolytic material are only functional (operationally ready) when they are operated within a specific temperature range. For this reason, it is partially necessary to provide a heating unit for appropriate sensors.

The temperature control unit can be configured in such a way that it permits individual regions of the exhaust gas sensor to be held in a pregiven temperature range by means of targeted cooling. In this way, an overheating can also be avoided.

The essence of the invention is that the arrangement of the invention permits operating characteristic variables of an engine to be determined in a workshop with the aid of a suitable sensor without the necessity of acting in the engine compartment. Operating characteristic variables such as the crankshaft speed and the content of exhaust gas components, exhaust gas temperature and the like are determined.

Pursuant to the first embodiment of the arrangement of the invention, the foregoing is achieved in that first means are provided in the exhaust gas sensor which record the pressure of the exhaust gas. The crankshaft speed can be arrived at from the output signal of the first means.

Further means are provided in the exhaust gas sensor and the output signals of these means constitute a measure for the content of an exhaust gas component such as the exhaust gas temperature or the like. This makes it possible to draw conclusions as to the following: the air/fuel mixture supplied to the engine, the course of the combustion in the engine and further operating parameters.

Pursuant to another embodiment of the arrangement according to the invention, an exhaust gas sensor is utilized wherein the first means is configured as a flow meter, temperature sensor or hot wire flow speed indicator.

Cyclical waveforms develop in the exhaust gas because of the pressure fluctuations mentioned above and shown in FIG. 3. These cyclical flow waveforms can be detected and likewise permit conclusions to be drawn with respect to engine speed.

The cyclic discharge of the exhaust gases causes a cyclical temperature course similar to the cyclical pressure course shown in FIG. 3. These exhaust gases originate because of the combustion process and are therefore very hot.

In this way, an evaluation of the temperature in the exhaust gas system likewise permits to arrive at the speed of the engine.

The embodiments described above can be further configured in that the sensor utilized is accommodated temporarily or permanently in the exhaust gas system of the engine.

Especially in the second case, the output signals of the exhaust gas sensor utilized can, in turn, be utilized individually or together intermittently for the control of operating characteristic variables of the engine. Possibilities are then provided to conduct the output signals of the exhaust gas sensor quickly and simply to a diagnostic unit in a workshop area.

It is understood that the foregoing description is that of the preferred embodiments of the invention and that various changes and modifications may be made thereto without departing from the spirit and scope of the invention as defined in the appended claims.

What is claimed is:

1. An arrangement for measuring a first and a second operating characteristic variable of an internal combustion engine having an exhaust gas system for conducting exhaust gas having physical/chemical characteristics indicative of said variables, the arrangement comprising:

a detection device arranged in said exhaust gas system; and said detection device including: first means for responding to a first one of said characteristics of the exhaust gas to permit said first variable to be determined; and, second means for responding to a second one of said characteristics of the exhaust gas to permit said second variable to be determined, said first variable being engine speed and the second variable being the content of a component in the exhaust gas.

2. The arrangement of claim 1, wherein said first means permits a temperature to be measured in the exhaust gas.

3. The arrangement of claim 1, wherein said sensor device is configured so as to permit permanently mounting said device in the exhaust gas system; and, the output signals of said sensor device operate to at least intermittently control operating characteristic variables of the engine.

4. The arrangement of claim 1, wherein said first means and said second means are sensitive to temperature; and, mounting means for mounting said first means and said second mean in the exhaust system; and, said mounting means being made of a material to prevent said first means and said second means from becoming overheated.

5. The arrangement of claim 4, wherein said detection device is geometrically formed so as to prevent exhaust gases flowing by along the outside of said detection device from reaching the respective regions of said first means and said second means.

6. The arrangement of claim 4, wherein said detection device includes an enclosure for surrounding said first and second means; and, said enclosure has surface means configured of a material permitting an optimal transfer of heat.

7. The arrangement of claim 4, wherein said enclosure is made of a material having a heat conductivity and heat capacity for permitting an optimal heat transfer.

8. The arrangement of claim 1, further comprising temperature control means for maintaining the temperature of individual components of said detection device within a temperature range wherein said components are operationally ready and do not become overheated.

9. An arrangement for measuring operating characteristic variables of an internal combustion engine having an exhaust gas system for conducting the exhaust gas having respective characteristics which are indicative of said variables, the arrangement comprising:

a detection device arranged in said exhaust gas system;

said detection device including: a first sensor for responding to a first one of said characteristics of the exhaust gas so as to permit a first one of said variables of the engine to be measured;

a second sensor for responding to a second one of the characteristics of the exhaust gas so as to permit a second one of said variables of the engine to be measured; and, said characteristics being selected from the group consisting of exhaust gas composition pressure, flow and sound.

* * * * *

UNITED STATES PATENT AND TRADEMARK OFFICE
CERTIFICATE OF CORRECTION

PATENT NO. : 5,216,881

DATED : June 8, 1993

INVENTOR(S) : Jürgen Anlauf, Walter Dinkelacker, Gerhard Haaga, Alexander Schwarz, Raymond Sieg and Ulrich Schlienz It is certified that error appears in the above-identified patent and that said Letters Patent is hereby corrected as shown below:

In column 4, line 7: between "is" and "mount", please insert -- preferably attached to the pipe 21 by means of a rubber --.

In column 6, line 65: after "and", insert -- , --.

In column 7, line 19: delete "mean" and substitute -- means -- therefor.

Signed and Sealed this

Eighth Day of March, 1994

*Attest:*

BRUCE LEHMAN

*Attesting Officer*  *Commissioner of Patents and Trademarks*